United States Patent
Legois et al.

(10) Patent No.: US 12,109,782 B2
(45) Date of Patent: Oct. 8, 2024

(54) LAMINATED GLAZING INCORPORATING THE ANTENNAS OF THE AUTOMATIC LANDING ASSISTANCE SYSTEM

(71) Applicant: SAINT-GOBAIN GLASS FRANCE, Courbevoie (FR)

(72) Inventors: Vincent Legois, Germigny des Pres (FR); Vincent Rachet, Saint Cyr en Val (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 303 days.

(21) Appl. No.: 17/618,168

(22) PCT Filed: Jun. 10, 2020

(86) PCT No.: PCT/EP2020/066029
§ 371 (c)(1),
(2) Date: Dec. 10, 2021

(87) PCT Pub. No.: WO2020/249589
PCT Pub. Date: Dec. 17, 2020

(65) Prior Publication Data
US 2022/0324204 A1    Oct. 13, 2022

(30) Foreign Application Priority Data
Jun. 13, 2019   (FR) ...................... 1906273

(51) Int. Cl.
*B32B 7/12*    (2006.01)
*B32B 17/10*    (2006.01)
(Continued)

(52) U.S. Cl.
CPC .......... *B32B 17/10376* (2013.01); *B32B 7/12* (2013.01); *B32B 17/10045* (2013.01);
(Continued)

(58) Field of Classification Search
None
See application file for complete search history.

(56) References Cited

U.S. PATENT DOCUMENTS

2003/0034926 A1* 2/2003 Veerasamy .............. H01Q 1/36
343/711
2008/0318011 A1* 12/2008 Chaussade .......... B32B 17/1077
428/210

(Continued)

FOREIGN PATENT DOCUMENTS

EP    0 608 180 A1    7/1994
EP    0 706 722 A1    4/1996
(Continued)

OTHER PUBLICATIONS

Seidenman et al, "How Next-Gen Aircraft Windows Have Become Safer And Stronger", Aviation Week Network website, https://aviationweek.com/mro/emerging-technologies/how-next-gen-aircraft-windows-have-become-safer-stronger (Year: 2020).*
(Continued)

*Primary Examiner* — Dameon E Levi
*Assistant Examiner* — Anh N Ho
(74) *Attorney, Agent, or Firm* — Pillsbury Winthrop Shaw Pittman LLP

(57) ABSTRACT

A laminated glazing unit includes at least one first sheet of glass and one second sheet of glass glued to one another via a first adhesive interlayer, the first sheet of glass being intended to constitute the surface of the laminated glazing unit in contact with the outside atmosphere, in which the laminated glazing unit further includes, between the first sheet of glass and the second sheet of glass, an LOC (Localizer) antenna receiving between 100 and 120 MHz and a GLIDE (Slope) antenna receiving between 320 and 340 MHz, each antenna having dimensions that are sufficiently small not to hamper the vision, even to be practically invisible through the laminated glazing unit.

20 Claims, 3 Drawing Sheets

(51) Int. Cl.
  *B64C 1/14* (2006.01)
  *B64C 1/36* (2006.01)
  *H01Q 1/12* (2006.01)
  *H01Q 5/357* (2015.01)
  *H01Q 5/40* (2015.01)
  *H01Q 9/42* (2006.01)

(52) U.S. Cl.
  CPC .. *B32B 17/10211* (2013.01); *B32B 17/10302* (2013.01); *B32B 17/10761* (2013.01); *B32B 17/1077* (2013.01); *B32B 17/10788* (2013.01); *B64C 1/1492* (2013.01); *B64C 1/36* (2013.01); *H01Q 1/1271* (2013.01); *H01Q 5/357* (2015.01); *H01Q 5/40* (2015.01); *H01Q 9/42* (2013.01); *B32B 2307/732* (2013.01); *B32B 2605/18* (2013.01)

(56) References Cited

U.S. PATENT DOCUMENTS

| 2010/0020381 A1* | 1/2010 | Legois | B32B 17/1077 |
| | | | 359/275 |
| 2011/0068983 A1* | 3/2011 | Koide | H01Q 1/1271 |
| | | | 343/700 MS |
| 2019/0319334 A1* | 10/2019 | Dai | H01Q 1/1271 |

FOREIGN PATENT DOCUMENTS

| WO | WO 95/01660 A1 | 1/1995 |
| WO | WO 2017/178146 A1 | 10/2017 |

OTHER PUBLICATIONS

International Search Report as issued in International Patent Application No. PCT/EP2020/066029, dated Aug. 12, 2020.

* cited by examiner

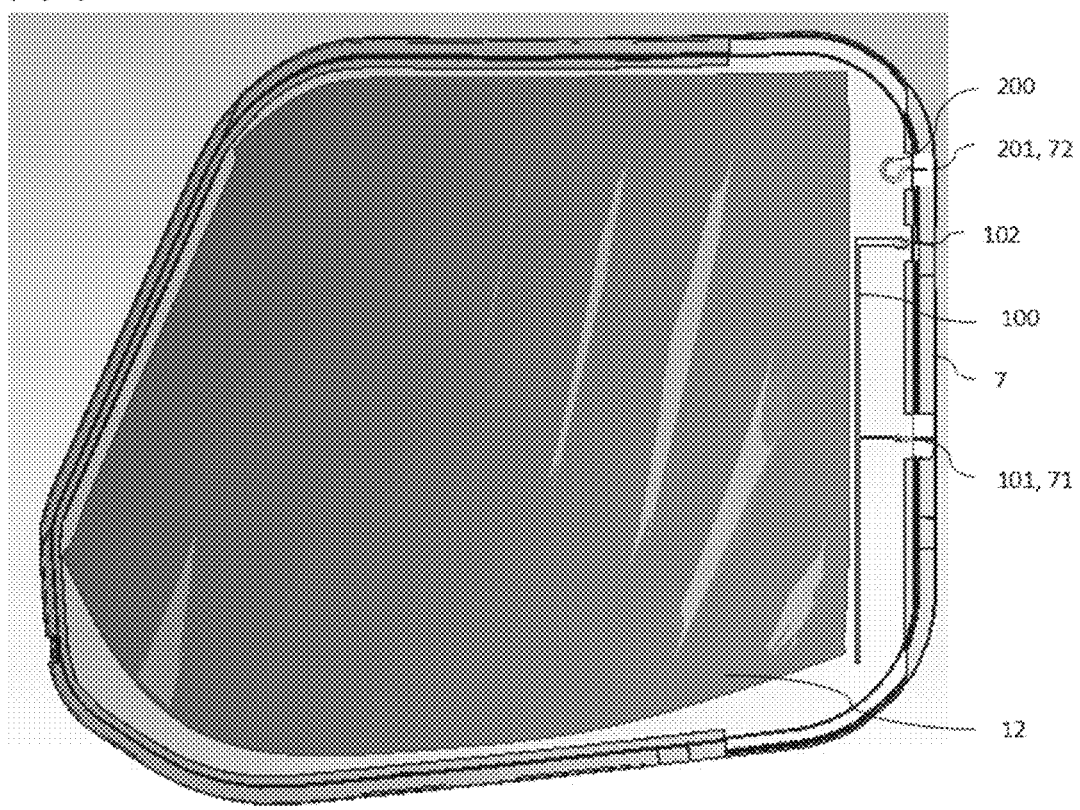
[Fig.1]

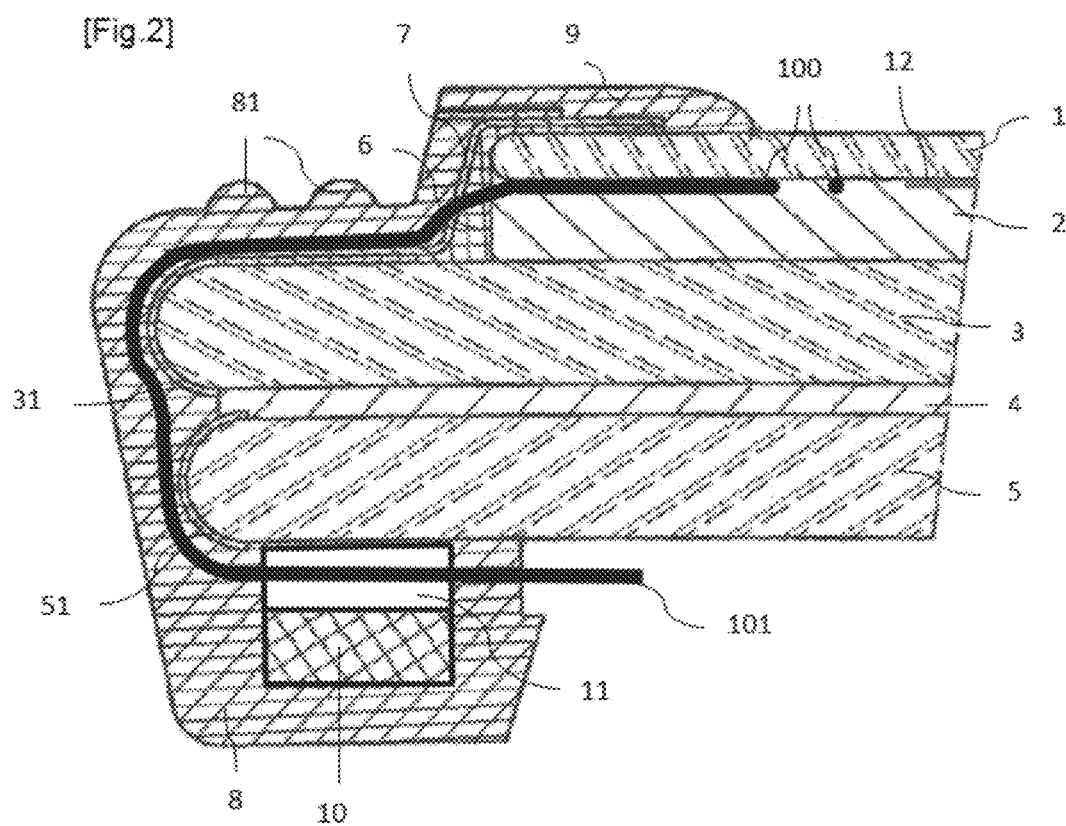

[Fig.3]
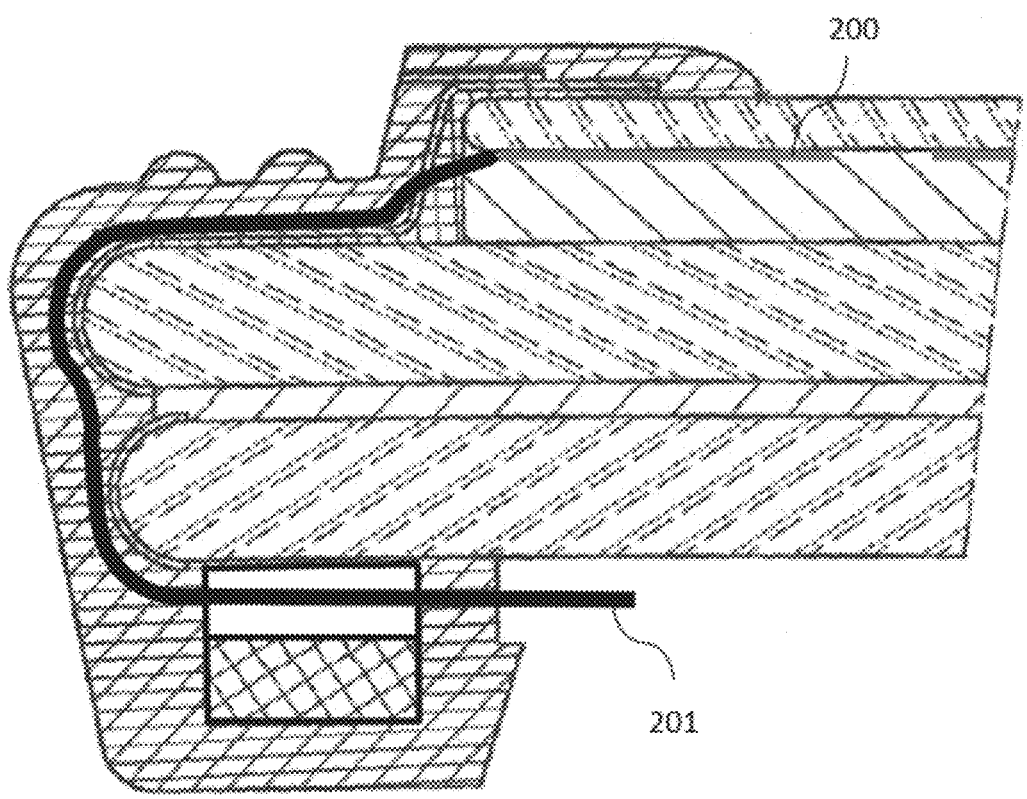

LAMINATED GLAZING INCORPORATING THE ANTENNAS OF THE AUTOMATIC LANDING ASSISTANCE SYSTEM

CROSS-REFERENCE TO RELATED APPLICATIONS

This application is the U.S. National Stage of PCT/EP2020/066029, filed Jun. 10, 2020, which in turn claims priority to French patent application number 1906273 filed Jun. 13, 2019. The content of these applications are incorporated herein by reference in their entireties.

The present invention deals with the field of pressurized or unpressurized aircraft with fixed or rotating wings, such as commercial airplanes, civilian airplanes (Airbus A320 or Boeing 737 type) or military aircraft, helicopters, space shuttles which these days use the automatic landing assistance system, or Instrument Landing System ILS, allowing a precision approach (vertical and horizontal plane guidance) even with degraded weather conditions. These antennas are generally placed in the nose of the airplane behind the radome. They are connected to the flight computer by coaxial cables.

This system is based on two antennas:
- an LOC (Localizer) antenna receiving in the VHF band at a frequency close to 110 MHz (between 108.10 MHz and 111.95 MHz);
- a GLIDE (Slope) antenna using UHF frequencies of between 328.65 MHz and 335.40 MHz.

This system of two antennas receives from the ground guidance information in the vertical and horizontal planes and transmits that information to the flight computer for the final approach (landing) in particular. It can consist of a single antenna hereinafter called ILS antenna.

The ILS antenna can also be installed in the door of the front landing gear, as described in the application EP 0 706 722 A1, It then uses the inherent electrical properties associated with the door of the front landing gear made of graphite/epoxy composite.

The airplanes can also be equipped with other antennas (GPS, WIFI), the location of which can have significant repercussions on the aerodynamics and/or the weight of the airplane. By incorporating thin planar antennas in the glazing units (windshield, cockpit side windows, passenger portholes) it becomes possible to save on weight by reducing the number of elements (antennas, cables, etc.) to be installed on the fuselage.

These days, no kind of antenna (ILS, GPS) is incorporated in the glazing units of the airplane cockpits. Now, the inventors have perceived the noteworthy benefit of incorporating certain antennas in glazing units of airborne vehicles, notably airplanes, helicopters, notably at the front of the vehicles to guarantee a good reception of the signals. Thus, incorporating an antenna in a glazing unit at the front of the vehicle, notably a cockpit glazing unit, offers the advantage of reducing the length of the cables (therefore the weight) for linking the antenna to the flight computer.

These antennas require a connector which must be incorporated in the glazing unit. That therefore has to be done within good engineering practices in order not to create an embrittlement zone and not to degrade the resistance of the glazing unit to aging (penetration of moisture, corrosion of the connector, etc.).

The signals must then be converted by digital/analog conversion in order to be able to be read by the flight computer. A conversion system must therefore be added and incorporated either close to the glazing unit (little space available) or close to the computer.

The inventors have therefore produced the invention whose subject, to this end, is a laminated glazing unit comprising at least one first sheet of glass and one second sheet of glass glued to one another via a first adhesive interlayer, the first sheet of glass being intended to constitute the surface of the laminated glazing unit in contact with the outside atmosphere, characterized in that the laminated glazing unit comprises, between the first sheet of glass and the second sheet of glass, an LOC (Localizer) antenna receiving between 100 and 120 MHz and a GLIDE (Slope) antenna receiving between 320 and 340 MHz, each antenna having dimensions that are sufficiently small not to hamper the vision, even to be practically invisible through the laminated glazing unit, Each of the two antennas independently of one another can be embedded in the first adhesive interlayer or, on the contrary, in contact with the face of the first or the second sheet of glass oriented toward this layer.

Preferably, the LOC (Localizer) antenna and the GLIDE (Slope) antenna are combined in a single antenna composed of a conductive metal wire with a diameter of between 10 and 500 μm running twinned with an F-shaped geometry. Here and hereinbelow, a conductor is understood to mean a conductor of electricity.

In ascending order of preference, the diameter of the conductive metal wire is at most equal to 300, 200 and 100 μm.

In a preferred configuration notably in the commercial airplanes cited previously, the edge of the first sheet of glass is set back relative to that of the second, a peripheral part of the free surface of the first sheet of glass, the rim of the latter, the rim of the first adhesive interlayer and a part of the surface of the second sheet of glass extending beyond the first sheet of glass describing a stepped continuous outline which is covered by a stepped element with the insertion of glue.

In this configuration, the stepped element is advantageously conductive and linked to the ground, the two parallel branches of the F point toward the edge of the laminated glazing unit at a short distance therefrom, and the one of these two branches situated at the end of the F is linked to the stepped element while the other branch situated in an intermediate part of the F delivers the signals from the LOC (Localizer) antenna and from the GLIDE (Slope) antenna to the flight computer via means for digital/analog conversion of these signals.

According to a preferred feature of the laminated glazing unit of the invention, the face of the first sheet of glass oriented toward the first adhesive interlayer bears, in immediate proximity to one of its edges, a coating of conductive transparent oxide in the form of a fishhook emerging on this edge, and constituting a GPS antenna. This antenna is designed to operate for the reception of frequencies lying between approximately 1300 and 1800 MHz.

The face of the first sheet of glass oriented toward the first adhesive interlayer can also bear a coating of heating conductive transparent oxide of the same nature as that of the GPS antenna, but distinct therefrom and separated therefrom by an appropriate distance so as not to disturb the reception of its signal. Such a heating coating situated as close as possible to the outside atmosphere in the laminated structure has, as is known, an anti-icing function. The heating coating and the GPS antenna can consist of a thin layer such as one made of gold, multilayers of silver, tin-doped indium oxide (ITO, for indium tin oxide), ZnO:Al, SnO:F, etc.

The GPS antenna can be formed by chemical or laser etching, with a fishhook form, of the thin heating layer. It is thus transparent and its local light transmission is identical to that of the windshield in the heating zone and practically invisible from inside the cockpit. Installed on an edge of the glazing unit, it can be situated outside of the field of vision of the pilot, which depends on the form/size of the glazing unit.

Preferably, the outputs of the antennas are produced with insulated braids (electrical insulating sheaths) and/or with cables such as coaxial cables and/or with flat connectors such as contact studs and/or by any other appropriate means. The realization can be identical to that of the outputs of the temperature probes already incorporated in the lamination.

Preferably, opposite each antenna output delivering a signal, the stepped element is absent over a minimum width of 2×20, preferably 2×30 mm; that constitutes a passage for the antenna output that is sufficiently wide for the conductive material of the stepped element not to disturb the transmission of the signal from the antenna.

Preferably, the stepped element is covered by an air- and water-tight seal, and one that protects against solar radiation and fluids.

Preferably, the stepped element is covered by a bead which gives the laminated glazing unit an aerodynamic continuity between glazing unit and mounting structure such as airplane structure and a good inertia to the treatment fluids such as aeronautical fluids, cleaning products, degreasing agent, glycol for deicing on the ground and the like.

Preferably, the laminated glazing unit comprises at least one third sheet of glass linked to the second sheet of glass by a second adhesive interlayer.

Preferably, the first sheet of glass is made of mineral glass with a thickness of between 0.5 and 5, preferably between 2 and 4 mm, or of polymer material such as poly(methylmethacrylate) (PMMA) with a thickness of between 0.5 and 5 mm.

Preferably, the second sheet of glass, and if appropriate the third sheet of glass, even the subsequent ones, are made of mineral glass with a thickness of between 4 and 10 mm, or of polymer material such as poly(methylmethacrylate) (PMMA) with a thickness of between 5 and 30, preferably at most 20 mm.

Preferably, the adhesive interlayers are made of polyurethane (PU), polyvinylbutyral (PVB), ethylene—vinyl acetate (EVA) or equivalent, the thickness of the first adhesive interlayer is between 3 and 10, preferably 4 and 8 mm, and the thickness of the second adhesive interlayer and if appropriate the subsequent ones is between 0.5 and 4, preferably at most equal to 2 mm.

Another object of the invention is the application of a laminated glazing unit as described above to a glazing unit of pressurized or unpressurized aircraft with fixed or rotating wings, in particular to a glazing unit of a civilian commercial or military airplane, helicopter or space shuttle, and, in an absolutely prioritized manner, to a front-end glazing unit of an airplane cockpit, in which the antenna outputs pass through the rear edge of the glazing unit in immediate proximity to which the antennas are positioned.

The attached drawings illustrate the invention:

[FIG. 1] is a front schematic view of a front-end windshield of a civilian commercial airplane cockpit according to the invention.

[FIG. 2] is a cross-sectional schematic view of such a front-end windshield representing the LOC (Localizer) antenna and the GLIDE (Slope) antenna combined in a single antenna.

[FIG. 3] is a cross-sectional schematic view of such a front-end windshield representing the GPS antenna.

Referring to FIG. 1, a front-end windshield of a civilian commercial airplane cockpit is equipped with a stepped peripheral element 7, a heating conductive transparent oxide coating 12, an LOC (Localizer) antenna and a GLIDE (Slope) antenna combined in a single antenna 100 and a GPS antenna 200.

The stepped element 7 is conductive and linked to the ground. It comprises reserves 71, 72 40 mm (possibly 60 mm) wide, through which pass the antenna outputs 101 delivering the signals from the LOC (Localizer) and GLIDE (Slope) antennas on the one hand, and 201 delivering the signal from the GPS antenna on the other hand. There is thus no disturbance of the antenna signals due to the stepped element 7.

The antenna 100 is composed of a conductive metal wire with a diameter of between 10 and 500 μm running twinned with an F-shaped geometry. The twinned wire constituting the branch 102 situated at the end of the F is linked to the stepped element 7, that is to say to the ground; a partial cutout of the latter 7 not apparent in the figure is provided for this purpose.

The GPS antenna 200 is etched in the same conductive material as that of the heating layer 12, from which it is sufficiently separated for the latter 12 not to disturb the reception of the GPS antenna 200.

Hereinafter in these examples, a sheet of glass denotes a sheet of chemically tempered aluminosilicate glass, marketed by the company Saint-Gobain Sully under the registered trademark Solidion®.

Referring to FIG. 2, the laminated glazing unit of FIG. 1 comprises a first sheet of glass 1 constituting an outer face of the glazing unit, 3 mm thick, glued to a second sheet of glass 3 8 mm thick by a first adhesive interlayer 2 of polyurethane (PU) 5.76 mm thick.

A third sheet of glass 5 8 mm thick is glued to the second 3 by a second adhesive interlayer 4 of polyvinylbutyral (PVB) 2 mm thick.

The rims of the second and third sheets of glass 3, 5 are protected from impacts by relatively hard elastomer sheets 31, 51.

The edge of the first sheet of glass 1 is set back relative to that of the second 3, a peripheral part of the free surface of the first sheet of glass 1, the rim of the latter 1, the rim of the first adhesive interlayer 2 and a part of the surface of the second sheet of glass 3 extending beyond the first sheet of glass 1 describing a stepped continuous outline which is covered by a stepped element 7 made of conductive metal. The stepped metal element 7 is linked to the ground.

Said stepped continuous outline is covered by the stepped element 7 with the insertion of a 100 μm thickness of polysulfide glue 6.

The stepped element 7 is covered by an air- and water-tight seal 8, made of silicone, and by a bead 9 of polysulfide which provides the laminated glazing unit with an aerodynamic continuity between glazing unit and mounting structure such as airplane structure and a good inertia to the treatment fluids as already explained.

The outer surface of the silicone seal 8 has sealing lips 81. Furthermore, in the bottom part of the silicone seal 8, a shim 10 of a material harder than silicone is inserted so as to guarantee that the laminated glazing unit is well held in its mounting position, by exerting a certain pressure, such as by pinching. The shim 10 is solid, but comprises voids 11 as represented in FIG. 2, and the function of which will be explained hereinbelow.

The face of the sheet of glass 1 oriented toward the inside of the laminated structure bears a heating layer 12 whose edge is visible, consisting of tin-doped indium oxide (ITO, for indium tin oxide) or equivalent such as gold, a multilayer of silver, ZnO:Al, $SnO_2$:F, etc. The heating layer 12 is effective for deicing the outer surface of the sheet of glass 1.

As explained with reference to FIG. 1, the LOC (Localizer) antenna and the GLIDE (Slope) antenna are combined in a single antenna 100 composed of a conductive metal wire with a diameter of between 10 and 500 μm running twinned with an F-shaped geometry. FIG. 2 shows, however schematically, the separation of the two wires of the antenna 100 in the selected cross-sectional plane.

The antenna 100 is composed of a copper wire with a diameter of 31 μm, of a conductivity equal to 5.76 $10^7$ S/m. The glass has a relative permittivity or dielectric constant $E_r$ of 6.7 and a delta tangent or dielectric dissipation factor (qualifying the losses of the dielectric material) Tan d of 0.03. For polyurethane, $E_r$ is 2.9 and Tan d is 0.2.

The antenna 100 is represented at the interface between the first sheet of glass 1 and the first adhesive interlayer 2. Alternatively, it can be embedded in the polyurethane 2, by inserting it between two plies of polyurethane at the start of the lamination, for example.

The wire of the antenna 100 is extended into the silicone seal 8, in front of the rim of the second and third sheets of glass 3 and 5, then into the void 11 formed for this purpose in the shim 10. The antenna output 101 of the antenna 100 emerges from the silicone seal 8 in proximity to the face of the laminated glazing unit intended to be oriented toward the cockpit of the airplane. The antenna output 101 is linked to the flight computer via means, not represented, for the digital/analog conversion of the signals from the LOC (Localizer)/GLIDE (Slope) antenna 100.

The antenna output 101 is produced with insulated braids (electrical insulating sheaths) or with cables (for example DR24), notably coaxial cables as can be done for the outputs of the temperature probes already incorporated in the lamination.

Referring to FIG. 3, the GPS antenna 200 of the laminated glazing unit of FIG. 1 is placed at the interface between the first sheet of glass 1 and the first adhesive interlayer 2. It consists of the same material as that of the heating layer 12 described with reference to FIG. 2 above. It is a layer of ITO 800 nm thick, having a conductivity of 5.5 $10^5$ S/m.

The two antennas 100, 200 are perfectly functional.

The invention claimed is:

1. A laminated glazing unit comprising at least one first sheet of glass and one second sheet of glass glued to one another via a first adhesive interlayer, the first sheet of glass being intended to constitute a surface of the laminated glazing unit in contact with an outside atmosphere, and, between the first sheet of glass and the second sheet of glass, an LOC (Localizer) antenna receiving between 100 and 120 MHz and a GLIDE (Slope) antenna receiving between 320 and 340 MHz, wherein each of the LOC (Localizer) antenna and the GLIDE (Slope) antenna is composed of a conductive metal wire of a diameter of between 10 and 500 μm.

2. The laminated glazing unit as claimed in claim 1, wherein a face of the first sheet of glass oriented toward the first adhesive interlayer bears, in immediate proximity to an edge of the first sheet of glass, a coating of conductive transparent oxide in the form of a fishhook emerging on said edge, and constituting a GPS antenna.

3. The laminated glazing unit as claimed in claim 2, wherein the face of the first sheet of glass oriented toward the first adhesive interlayer bears a coating of heating conductive transparent oxide of a same nature as that of the GPS antenna, but distinct therefrom and separated therefrom by a distance so as not to disturb the reception of its signal.

4. The laminated glazing unit as claimed in claim 1, further comprising at least one third sheet of glass linked to the second sheet of glass by a second adhesive interlayer.

5. The laminated glazing unit as claimed in claim 4, wherein the first and second adhesive interlayers are made of polyurethane (PU), polyvinylbutyral (PVB), ethylene-vinyl acetate (EVA), in wherein a thickness of the first adhesive interlayer is between 3 and 10 mm and wherein a thickness of the second adhesive interlayer is between 0.5 and 4 mm.

6. The laminated glazing unit as claimed in claim 1, wherein the first sheet of glass is made of mineral glass of a thickness of between 0.5 and 5 mm or of polymer material with a thickness of between 0.5 and 5 mm.

7. The laminated glazing unit as claimed in claim 1, wherein the second sheet of glass, and an optional third sheet of glass are made of mineral glass with a thickness of between 4 and 10 mm, or of polymer material with a thickness of between 5 and 30 mm.

8. A glazing unit of a pressurized or unpressurized aircraft with fixed or rotating wings comprising the laminated glazing as claimed in claim 1.

9. The glazing unit as claimed in claim 8, wherein the aircraft is a civilian commercial or military airplane, helicopter or space shuttle.

10. The glazing unit as claimed in claim 9, wherein the glazing unit is an airplane cockpit front-end glazing unit, in which antenna outputs pass through a rear edge of the glazing unit in immediate proximity to which the antennas are positioned.

11. A laminated glazing unit comprising at least one first sheet of glass and one second sheet of glass glued to one another via a first adhesive interlayer, the first sheet of glass being intended to constitute a surface of the laminated glazing unit in contact with an outside atmosphere, and, between the first sheet of glass and the second sheet of glass, an LOC (Localizer) antenna receiving between 100 and 120 MHz and a GLIDE (Slope) antenna receiving between 320 and 340 MHz, wherein the LOC (Localizer) antenna and the GLIDE (Slope) antenna are combined in a single antenna composed of a conductive metal wire of a diameter of between 10 and 500 μm running twinned with an F-shaped geometry.

12. The laminated glazing unit as claimed in claim 11, wherein the diameter of the conductive metal wire is at most equal to 300 μm.

13. The laminated glazing unit as claimed in claim 12, wherein the diameter of the conductive metal wire is at most equal to 200 μm.

14. The laminated glazing unit as claimed in claim 13, wherein the diameter of the conductive metal wire is at most equal to 100 μm.

15. The laminated glazing unit as claimed in claim 11, wherein an edge of the first sheet of glass is set back relative to that of the second glass sheet, a peripheral part of a main surface of the first sheet of glass, a rim of the first sheet of glass, a rim of the first adhesive interlayer and a part of the surface of the second sheet of glass extending beyond the first sheet of glass describing a stepped continuous outline which is covered by a stepped element with the insertion of glue.

16. The laminated glazing unit as claimed in claim 15, wherein the stepped element is conductive and linked to a ground, wherein two parallel branches of a F of the F-shaped geometry point toward an edge of the laminated glazing unit at a short distance therefrom, and wherein one branch of the two branches situated at an end of the F is linked to the stepped element while the other branch situated in an intermediate part of the F delivers signals from the LOC (Localizer) antenna and from the GLIDE (Slope) antenna to a flight computer via digital/analog conversion of the signals.

17. The laminated glazing unit as claimed in claim 16, wherein outputs of the antennas are produced with insulated braids and/or with cables.

18. The laminated glazing unit as claimed in claim 16, wherein, opposite each antenna output delivering a signal, the stepped element is absent over a minimum width of 2×20 mm.

19. The laminated glazing unit as claimed in claim 15, wherein the stepped element is covered by an air- and water-tight seal, and one that protects against solar radiation and fluids.

20. The laminated glazing unit as claimed in claim 15, wherein the stepped element is covered by a bead which gives the laminated glazing unit an aerodynamic continuity between glazing unit and mounting structure and inertia to the treatment fluids including aeronautical fluids, cleaning products, degreasing agent, glycol for deicing on the ground.

* * * * *